US008172709B2

(12) United States Patent
Bodensteiner et al.

(10) Patent No.: US 8,172,709 B2
(45) Date of Patent: May 8, 2012

(54) TENSIONING RAIL OR GUIDE RAIL WITH SECURING MEANS FOR RETAINING BOLTS

(75) Inventors: Martin Bodensteiner, Erding (DE); Henning Geibel, Wessling (DE)

(73) Assignee: IWIS Motorsysteme GmbH & Co. KG, Munich (DE)

( * ) Notice: Subject to any disclaimer, the term of this patent is extended or adjusted under 35 U.S.C. 154(b) by 624 days.

(21) Appl. No.: 12/300,880

(22) PCT Filed: Feb. 2, 2007

(86) PCT No.: PCT/EP2007/000922
§ 371 (c)(1),
(2), (4) Date: Feb. 2, 2009

(87) PCT Pub. No.: WO2007/131557
PCT Pub. Date: Nov. 22, 2007

(65) Prior Publication Data
US 2010/0062887 A1    Mar. 11, 2010

(30) Foreign Application Priority Data
May 16, 2006   (DE) .................... 20 2006 007 821 U

(51) Int. Cl.
$F16H\ 7/18$ (2006.01)
$F16H\ 7/22$ (2006.01)
$F16H\ 7/08$ (2006.01)
(52) U.S. Cl. .................... 474/140; 474/110; 474/111

(58) Field of Classification Search .................. 474/410, 474/411, 140, 110, 111; 411/107, 353, 970, 411/999
See application file for complete search history.

(56) References Cited

U.S. PATENT DOCUMENTS

| 4,002,327 | A |   | 1/1977  | Damon          |         |
|-----------|---|---|---------|----------------|---------|
| 4,616,953 | A | * | 10/1986 | Gomes          | 403/292 |
| 4,832,664 | A | * | 5/1989  | Groger et al.  | 474/111 |
| 5,746,673 | A |   | 5/1998  | Polster et al. |         |
| 5,961,411 | A | * | 10/1999 | Tsutsumi et al.| 474/111 |
| 6,572,502 | B1|   | 6/2003  | Young et al.   |         |
| 2004/0147350 | A1 | | 7/2004 | Kurohata et al. |        |

FOREIGN PATENT DOCUMENTS

| DE | 295 20 943 U1 | 9/1995  |
| JP | 51-72859      | 6/1976  |
| JP | 57-124614     | 8/1982  |
| JP | 62-13220      | 1/1987  |
| JP | 3-99103       | 10/1991 |
| JP | 2004-232668   | 8/2004  |

* cited by examiner

Primary Examiner — Sang Kim
Assistant Examiner — Henry Liu
(74) Attorney, Agent, or Firm — Leydig, Voit & Mayer, Ltd.

(57) ABSTRACT

The present invention relates to a tensioning rail or a guide rail for tensioning and/or guiding a drive chain, comprising an opening for receiving a retaining bolt and a retaining bolt which can be inserted into the opening, wherein a lock device working between the retaining bolt and the opening is provided with a lock projection at the opening and a lock recess at the retaining bolt or vice versa, which lock device secures the retaining bolt in a mounting position relative to the opening and at least temporarily releases the retaining bolt in order to move it to a fixing position.

21 Claims, 3 Drawing Sheets

TENSIONING RAIL OR GUIDE RAIL WITH SECURING MEANS FOR RETAINING BOLTS

The present invention relates to a tensioning rail or a guide rail for tensioning and/or guiding a drive chain, comprising an opening for receiving a retaining bolt and a retaining bolt which can be inserted into the opening.

Apart from the high precision and high functionality desired for tensioning or guide rails, their ease of mounting is also in great demand, especially in the case of control chain drives on internal combustion engines. The control chain drives are often mounted under confined installation space conditions on the engine housing. The total width of all components of the control chain drive in the mounted state is here of decisive importance. While guide rails are most of the time firmly screwed to the engine block, the retaining bolt in tensioning rails simultaneously serves as a pivot axis for the tensioning rail. With both types of rails one still endeavors to improve the assembly of such rails, the assembly being mostly carried out by robots.

It is thus the object of the present invention to provide a simplified assembly of tensioning rail and guide rail of the aforementioned type with the help of a retaining bolt.

This object is achieved in a tensioning rail or guide rail of the type described at the outset in that a lock device working between the retaining bolt and the opening is provided with a lock projection at the opening and a lock recess at the retaining bolt, or vice versa, which lock device secures the retaining bolt in a mounting position relative to the opening and at least temporarily releases the retaining bolt in order to move it to a fixing position.

This means that the retaining bolt and the opening establish a lock connection during assembly, thereby providing a securing means for the retaining bolt. The bolt may here assume an insertion position within the opening that is of advantage to mounting. For instance, if a bolt is used with a screw-in thread, the thread can slightly project at one side to provide a threading aid for finding an internal thread, e.g. on an engine block. This, however, means also that the bolt is already fully threaded into the opening over part of its length and that the width of the tensioning rail is no longer needed as additional installation space for threading in the retaining bolt. As soon as an unlocking force is exerted, the bolt can be displaced axially relative to the opening. If a threaded bolt is used, this bolt can then be screwed in. The length of path available for mounting can be minimized relatively easily due to this pre-positioning of the retaining bolt in the mounting position. Furthermore, the retaining bolt is secured in the opening and cannot get lost during assembly, which would otherwise lead to assembly errors. Lock projection and lock recess are preferably designed as one part together with the corresponding element (retaining bolt or opening).

The lock recess is here formed in a constructionally simple way by way of a ring groove in one embodiment. Since at least in the case of tensioning rails rotation-symmetric cross-sections must be used for the retaining bolt, a surrounding ring groove is very well suited for this purpose. This is equally true for the lock projection in one embodiment if said projection is formed by a ring web or ring bead. Of course, both variants of configuration can also be imitated in their action by interrupted ring grooves and ring webs or ring beads.

Since the retaining bolt is secured in the opening only temporarily for the mounting process, the unlocking force to be overcome should only be so great that a mounting operation can be performed very easily and the lock secures the retaining bolt during mounting in an appropriate way. To this end the lock projection in one embodiment has a height not more than 10%, preferably not more than 5% and at least 1% of the diameter of the opening. Here, the higher values are rather used for lock projections arranged at one side while in the case of surrounding ring webs or ring beads heights of not more than 2.5% are definitely also realistic.

To provide also an axial securing means in the mounting position, a second lock recess may be provided according to a further variant, the second lock recess being arranged at a distance from the first lock recess, said distance corresponding substantially to the distance between the mounting position and the fixing position. This leads to a repeated locking in the fixing position. As a result, additional measures for axially securing the tensioning rail or guide rail on the retaining bolt can be omitted.

Furthermore, the present invention relates to a tensioning rail series and/or a guide rail series comprising a tensioning rail or a guide rail of a first overall width and a tensioning rail and/or a guide rail of a second overall width, a retaining bolt which can be inserted into a respective opening of both tensioning and/or guide rails, and a lock device working between the retaining bolt and the opening and comprising a lock projection and a lock recess on the retaining bolt, or vice versa, which lock device secures the retaining bolt in a mounting position relative to the opening and at least temporarily releases the retaining bolt in order to move it to a fixing position. Although the series tensioning rail and/or guide rail has a different overall width, one and the same type of retaining bolt is used, whereby the number of components can be reduced.

According to a development the tensioning rail and/or the guide rail and the retaining bolt have a mounting side, the mounting side of the retaining bolt and the mounting side of the tensioning rail and/or guide rail of the first and second overall width having the same relative position with respect to each other in the mounting position and in the fixing position. The tensioning rails or guide rails of the first and second overall width that are provided with the retaining bolt do not differ from one another at their mounting side with respect to the projection and arrangement of the retaining bolt, i.e. neither in the mounting position nor in the fixing position, whereby the same mounting conditions are created. It is just at the opposite side (the side facing away from the mounting side) that the retaining bolt assumes a slightly different relative position (greater or smaller projection or no projection at all). As a result, the mounting process of the tensioning and/or guide rails having different widths is also uniform and can be carried out in an almost identical way and can thus be automated very easily.

Embodiments of the present invention shall now be explained in more detail with reference to a drawing, in which.

Figure 1:
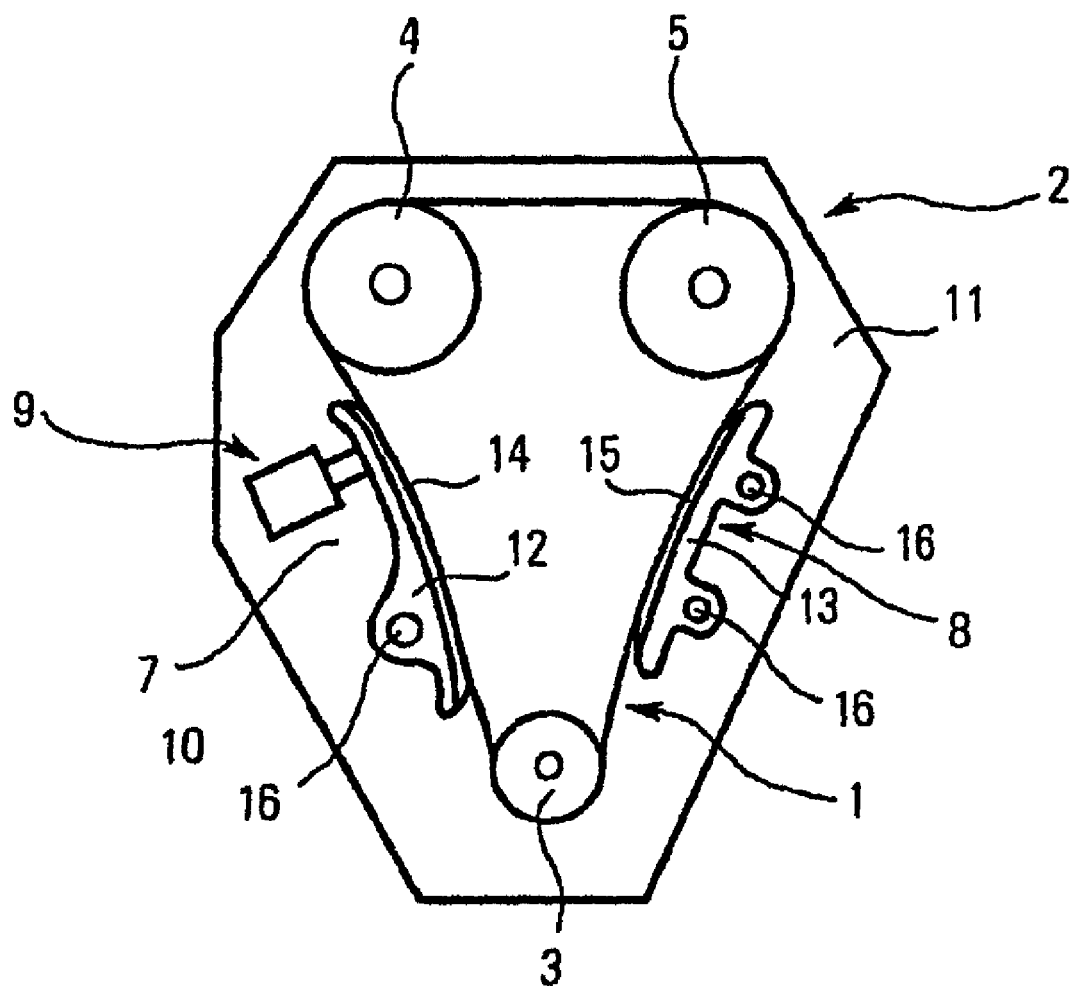
FIG. 1 is a schematic front view of a control chain drive.

FIG. 1 shows a control chain drive 1 of an internal combustion engine 2. It comprises a crankshaft sprocket 3, two top-sided camshaft sprockets 4 and 5, a control chain 6 guided around the sprockets, and a tensioning rail 7 and a guide rail 8. The tensioning rail 7 is pressed by means of a chain tensioner 9 against the control chain 6 and is pivotably supported about a pivot bearing 10 on the engine block 11. The guide rail 8 is firmly screwed onto the engine block 11. The tensioning rail 7 and the guide rail 8 are each made up of a carrier 12 and 13, respectively, and of a slideway lining body 14 and 15, respectively, arranged thereon. The carrier 12 or 13 and the slideway lining body 14 or 15 are each made, in conformity with their desired properties, from a respective material showing different properties. The tensioning rail 7 and the guide rail 8, respectively, are mounted on the engine block 11 by means of retaining bolts 16 which are identical in construction and shall be described in more detail below.

The schematic illustration of FIG. 1 shows the basic arrangement and use of such tensioning and guide rails 7 and 8, respectively. The tensioning and guide rails, however, can be configured in many ways. The present invention can be applied to the most different designs of such rails. That is why reference is made to the known prior art with respect to the detailed configuration of e.g. carrier and slideway-lining bodies.

An embodiment of a guide rail 8 shall now be described in more detail with reference to FIGS. 2 and 3.

Figure 2:
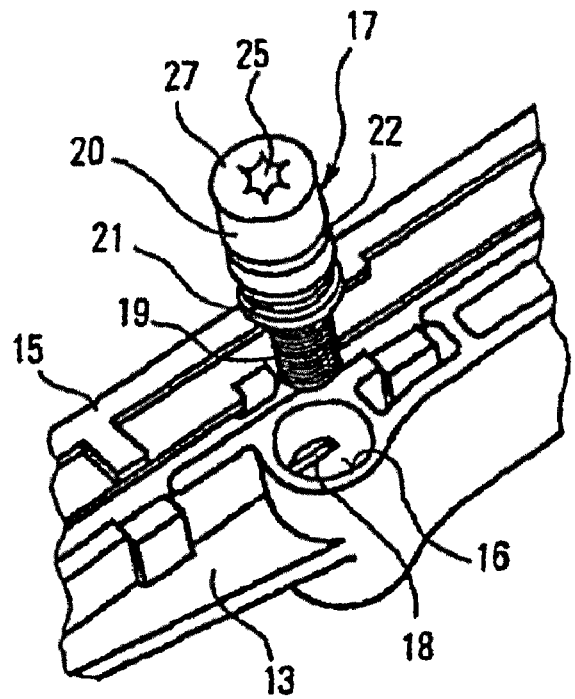
FIG. 2 is an exploded view of a section of a guide rail with retaining bolt.

As can particularly be seen in FIG. 2, the guide rail 8 consists of a fixed carrier 13 (here aluminum) and a slideway lining body 15 clipped thereonto, which is made from a plastic material having a low coefficient of friction. The carrier 13 comprises two openings 16 spaced apart from each other for receiving a retaining bolt 17. The opening 16 has a circular cross-section and is provided with a lock web 18 projecting at one side. The height H of the lock web 18 is about 8% of the diameter D of the opening 16 in the present case.

The holding bolt 17 comprises a threaded section 19 and a cylindrical insertion section 20. The insertion section 20 is provided with two ring grooves 21 and 22 arranged at some distance from each other. The depth of the ring grooves 21 and 22 is dimensioned such that the lock web 18 can be accommodated therein. The height of the lock web 18, however, makes it possible that due to an axial force exerted on the retaining bolt 17 and due to mostly elastic deformations (possibly with a certain plastic proportion) the retaining bolt 17 is axially displaceable and the lock web 18 thereby gets out of engagement with the first ring groove 21 and locks into the second ring groove 22 by overcoming a certain axial distance. The first ring groove 21 predetermines a mounting position and the second ring groove 22 a fixing position. The exact positions of said ring grooves 21 and 22 and the associated position of the ring web 18 become apparent from the description of an embodiment of an associated tensioning rail 7 according to FIGS. 4*a*, 4*b* and 5.

Figure 3:
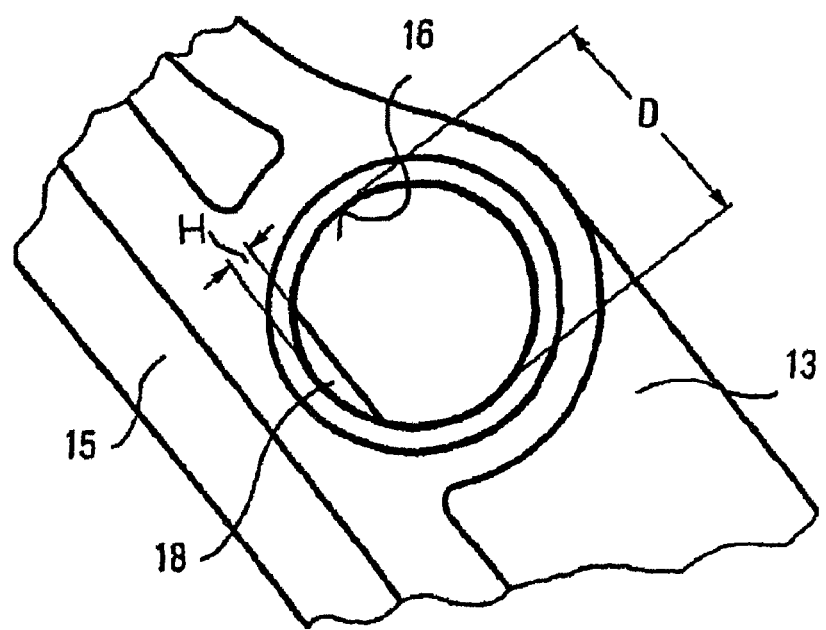
FIG. 3 is a top view on the section of the guide rail of FIG. 2 on an enlarged scale.
Figure 5:
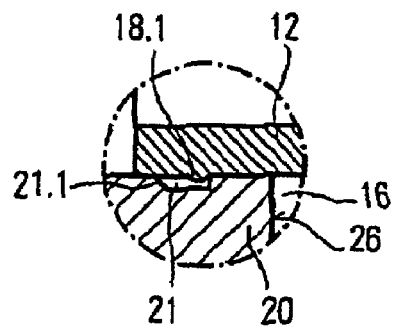
FIG. 5 shows detail V of FIG. 4a on an enlarged scale.
Figure 4B:
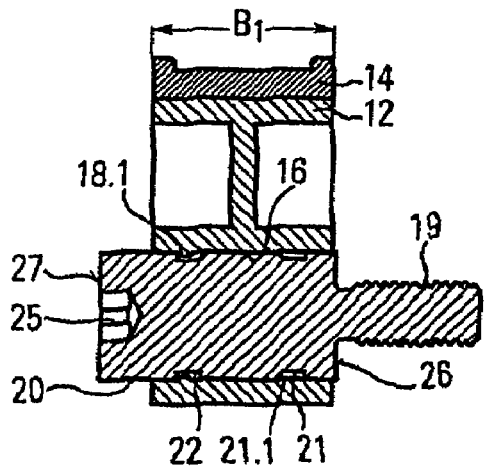
FIG. 4b is a sectional view through the tensioning rail of FIG. 4a in a fixing position.
Figure 4A:
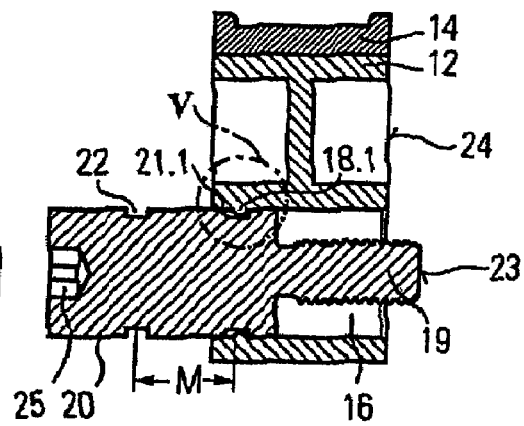
FIG. 4a is a sectional view through a tensioning rail in a mounting position.

Although FIGS. 4*a*, 4*b* and 5 show the pivot place of a tensioning rail 7, the difference with respect to the cross section of the embodiment of the guide rail according to FIGS. 2 and 3 resides otherwise just in the features that a surrounding ring web 18.1 is now used and that the depth of the two ring grooves 21 and 22 is adapted thereto. Otherwise, position and function are almost identical. In FIG. 4*a* the retaining bolt 17 and the tensioning rail 7 are locked with each other in a mounting position. The ring web 18.1 is here located in the first ring groove 21. As can be seen in FIG. 5, the ring web 18.1 is configured in the form of a bead or approximately in the form of a bead (trapezoidal in cross section), whereby it slides over the edges of the insertion section in a better way. At its side facing away from the threaded section 19 the first ring groove 21 comprises a ramp 21.1, which is conducive to a displacement of the retaining bolt 17 to the right side (see figure). The second ring groove 22 comprises straight side walls.

In the mounting position shown in FIG. 4*a*, a mounting side 23 of the retaining bolt 17 projects slightly beyond a mounting side 24 of the carrier 12 of the tensioning rail 7, thereby facilitating threading into the associated thread opening.

With the help of an axial force, which can also be exerted while the retaining bolt 17 is screwed in, the ring web 18.1 slides out of the first ring groove 21 and along the lateral area of the insertion section 20 until it locks in place in the second ring groove 22 and predetermines the fixing position shown in FIG. 4*b*. The center distance M of the two ring grooves 21 and 22 substantially predetermines the axial positional difference between the mounting position and the fixing position. The retaining bolt 17 is screwed in via the tool opening 25 arranged at the end side. In this position the ring web 18.1 rests on the left side wall of the ring groove 22, so that a kind of stop is formed in this position and the tensioning rail 7 is somewhat axially secured in position. At the opposite side the face 26 of the insertion section 20 projects slightly beyond the mounting side 24 of the carrier 12 to ensure the pivotability thereof.

A second embodiment of a tensioning rail 7 shall now be explained in more detail with reference to FIGS. 6*a* and 6*b*. Only the essential differences shall be discussed in the following. If identical components or components with the same action are referred to, the same reference numerals will be used and reference will be made to the above description.

Figure 6B:
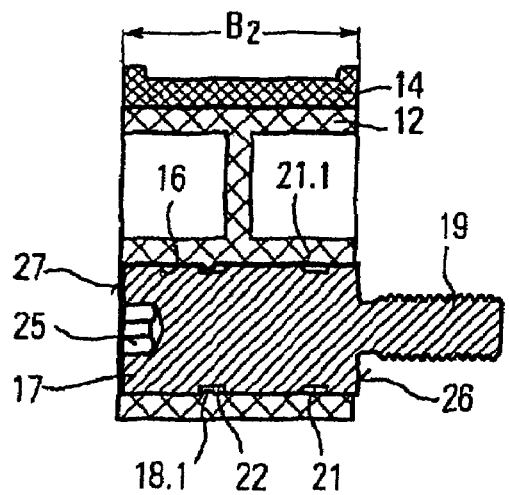
FIG. 6b shows the tensioning rail of FIG. 6a in full section in a fixing position.
Figure 6A:
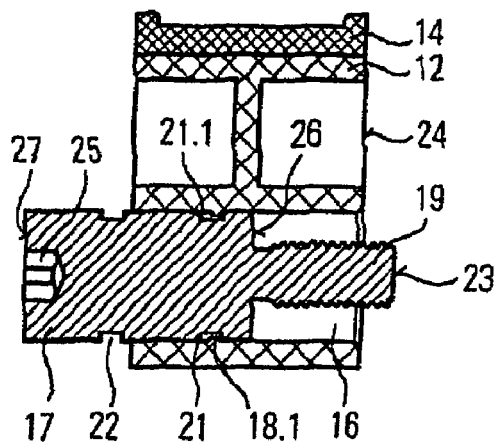
FIG. 6a shows a further embodiment of a tensioning rail in full section in a mounting position.

The main difference is that a tensioning rail of a first overall width $B_1$ is used in FIGS. 4*a* and 4*b* and a tensioning rail 7 of a second overall width $B_2$ in FIGS. 6*a* and 6*b*. The retaining bolt 17, however, is configured in the same way.

The tensioning rail 7 of FIGS. 4*a* and 4*b* is preferably used for simplex chains and the tensioning rail of FIGS. 6*a* and 6*b* for duplex chains. As becomes particularly apparent from a comparison between FIGS. 4*a* and 6*a*, the relative position of the mounting side 23 of the retaining bolt 17 and the mounting side 24 of the carrier 13 are identical with each other. This means that the threaded section 19 projects in the case of both rails to the same extent beyond the mounting side 24.

The same becomes also apparent from a comparison between FIGS. 4*b* and 6*b*. In this case the projection or distance between the mounting side 23 and the mounting side 24 is also identical in both embodiments. It is just the opposite face 27 of the retaining bolt 17 that shows a different position. In the fixing position this face is arranged outside the opening 16 at same distance whereas it is slightly retracted inside the opening 16 according to FIG. 6*b*.

These two embodiments show that one and the same retaining bolt 17 can be used for both the tensioning rail 7 according to FIGS. 4*a* and 4*b* and the tensioning rail 7 according to FIGS. 6*a* and 6*b*. Hence, a tensioning rail system is provided having retaining bolts 17 identical in construction, the system comprising a reduced number of parts due to the identical bolt. The mode of operation and function of the retaining bolt 17 is in this second embodiment identical with the embodiment of FIGS. 4*a* and 4*b*. Such a system can of course also be applied to guide rails or to a combination of guide rail and tensioning rail. This means that tensioning-rail and guide-rail systems can also be combined with one another, so that both tensioning rail and guide rail 7, 8 can be mounted inside a control chain drive 2 with the same retaining bolt 17 on the engine block 11.

For the sake of completeness it should here be noted that the opening 16 can also be provided with at least one ring groove and the insertion section 20 of the retaining bolt 17 with at least one lock projection and lock web 18 or 18.1, respectively, without leaving the teaching of the invention.

The invention claimed is:

1. A tensioning rail for tensioning or a guide rail for guiding a drive chain (6), comprising an opening (16) for receiving a retaining bolt (17) and a retaining bolt (17) which can be inserted into the opening (16), whereby a lock device working between the retaining bolt (17) and the opening (16) is provided with a lock projection (18, 18.1) at the opening (16) and a lock recess (21) at the retaining bolt (17), or vice versa, which lock device secures the retaining bolt (17) in a mounting position relative to the opening (16) and at least temporarily releases the retaining bolt (17) in order to move it to a fixing position, the retaining bolt (17) having a insertion section (20) and a threaded section (19), both for insertion into the opening (16), the lock recess (21) is formed at the outer circumference of the insertion section (20) and the threaded section slightly projects out of the opening on one side of the tensioning or guide rail (7, 8) in the mounting position to provide a threading aid.

2. The tensioning rail or the guide rail according to claim 1, wherein the lock recess (21) is formed by a ring groove.

3. The tensioning rail or the guide rail according to claim 1, wherein the lock projection (18.1) is formed by a ring web or ring bead.

4. The tensioning rail or the guide rail according to claim 1, wherein the lock projection (18, 18.1) has a height (H) not more than 10% of the diameter (D) of the opening (16) and at least 1% of the diameter (D) of the opening (16).

5. The tensioning rail or the guide rail according to claim 1, further comprising a second lock recess (22) arranged at a distance (M) from the first lock recess (21), said distance (M) corresponding substantially to the distance between the mounting position and the fixing position.

6. A tensioning rail series or a guide rail series comprising a tensioning rail or a guide rail (7, 8) of a first overall width ($B_1$), and a tensioning rail or a guide rail of a second overall width ($B_2$), both according to claim 1, respectively, a retaining bolt (17) which can be inserted into a respective opening (16) of both tensioning and/or guide rails (7, 8), and a lock device working between the retaining bolt (17) and the opening (16) and comprising a lock projection at the opening (16) and a lock recess (21) at the retaining bolt (17), or vice versa, which lock device secures the retaining bolt (17) in a mounting position relative to the opening (16) and at least temporarily releases the retaining bolt (17) in order to move it to a fixing position.

7. The tensioning rail series or the guide rail series according to claim 6, wherein a carrier (12, 13) of the tensioning or guide rail (7, 8) and the retaining bolt (17) comprise a respective mounting side (23, 24) and the mounting side (23) of the retaining bolt (17) and the mounting side (24) of the tensioning or guide rail (7, 8) of the first and second overall width ($B_1, B_2$) have the same distance to each other in the mounting position and in the fixing position, respectively.

8. The tensioning rail or the guide rail according to claim 2, wherein the lock projection (18.1) is formed by a ring web or ring bead.

9. The tensioning rail or the guide rail according to claim 2, wherein the lock projection (18, 18.1) has a height (H) not more than 10%, preferably not more than 5% and at least 1% of the diameter (D) of the opening (16).

10. The tensioning rail or the guide rail according to claim 3, wherein the lock projection (18, 18.1) has a height (H) not more than 10%, preferably not more than 5% and at least 1% of the diameter (D) of the opening (16).

11. The tensioning rail or the guide rail according to claim 2, further comprising a second lock recess (22) arranged at a distance (M) from the first lock recess (21), said distance (M) corresponding substantially to the distance between the mounting position and the fixing position.

12. The tensioning rail or the guide rail according to claim 3, further comprising a second lock recess (22) arranged at a distance (M) from the first lock recess (21), said distance (M) corresponding substantially to the distance between the mounting position and the fixing position.

13. The tensioning rail or the guide rail according to claim 4, further comprising a second lock recess (22) arranged at a distance (M) from the first lock recess (21), said distance (M) corresponding substantially to the distance between the mounting position and the fixing position.

14. A tensioning rail series or a guide rail series comprising a tensioning rail or a guide rail (7, 8) of a first overall width ($B_1$), and a tensioning rail or a guide rail of a second overall width ($B_2$), both according to claim 2, respectively, a retaining bolt (17) which can be inserted into a respective opening (16) of both tensioning or guide rails (7, 8), and a lock device working between the retaining bolt (17) and the opening (16) and comprising a lock projection at the opening (16) and a lock recess (21) at the retaining bolt (17), or vice versa, which lock device secures the retaining bolt (17) in a mounting position relative to the opening (16) and at least temporarily releases the retaining bolt (17) in order to move it to a fixing position.

15. The tensioning rail series or the guide rail series according to claim 14, wherein a carrier (12, 13) of the tensioning or guide rail (7, 8) and the retaining bolt (17) comprise a respective mounting side (23, 24) and the mounting side (23) of the retaining bolt (17) and the mounting side (24) of the tensioning or guide rail (7, 8) of the first and second overall width ($B_1, B_2$) have the same distance to each other in the mounting position and in the fixing position, respectively.

16. A tensioning rail series or a guide rail series comprising a tensioning rail or a guide rail (7, 8) of a first overall width ($B_1$), and a tensioning rail or a guide rail of a second overall width ($B_2$), both according to claim 3, respectively, a retaining bolt (17) which can be inserted into a respective opening (16) of both tensioning and/or guide rails (7, 8), and a lock device working between the retaining bolt (17) and the opening (16) and comprising a lock projection at the opening (16) and a lock recess (21) at the retaining bolt (17), or vice versa, which lock device secures the retaining bolt (17) in a mounting position relative to the opening (16) and at least temporarily releases the retaining bolt (17) in order to move it to a fixing position.

17. The tensioning rail series or the guide rail series according to claim 16, wherein a carrier (12, 13) of the tensioning or guide rail (7, 8) and the retaining bolt (17) comprise a respective mounting side (23, 24) and the mounting side (23) of the retaining bolt (17) and the mounting side (24) of the tensioning or guide rail (7, 8) of the first and second overall width ($B_1, B_2$) have the same distance to each other in the mounting position and in the fixing position.

18. A tensioning rail series or a guide rail series comprising a tensioning rail or a guide rail (7, 8) of a first overall width ($B_1$), and a tensioning rail or a guide rail of a second overall width ($B_2$), both according to claim 4, respectively, a retaining bolt (17) which can be inserted into a respective opening (16) of both tensioning or guide rails (7, 8), and a lock device working between the retaining bolt (17) and the opening (16) and comprising a lock projection at the opening (16) and a lock recess (21) at the retaining bolt (17), or vice versa, which lock device secures the retaining bolt (17) in a mounting position relative to the opening (16) and at least temporarily releases the retaining bolt (17) in order to move it to a fixing position.

19. The tensioning rail series or the guide rail series according to claim 18, wherein a carrier (12, 13) of the tensioning or guide rail (7, 8) and the retaining bolt (17) comprise a respective mounting side (23, 24) and the mounting side (23) of the retaining bolt (17) and the mounting side (24) of the tensioning or guide rail (7, 8) of the first and second overall width ($B_1$, $B_2$) have the same distance to each other in the mounting position and in the fixing position, respectively.

20. A tensioning rail series or a guide rail series comprising a tensioning rail or a guide rail (7, 8) of a first overall width ($B_1$), and a tensioning rail or a guide rail of a second overall width ($B_2$), both according to claim 5, respectively, a retaining bolt (17) which can be inserted into a respective opening (16) of both tensioning or guide rails (7, 8), and a lock device working between the retaining bolt (17) and the opening (16) and comprising a lock projection at the opening (16) and a lock recess (21) at the retaining bolt (17), or vice versa, which lock device secures the retaining bolt (17) in a mounting position relative to the opening (16) and at least temporarily releases the retaining bolt (17) in order to move it to a fixing position.

21. The tensioning rail or the guide rail according to claim 1, wherein the lock projection (18, 18.1) has a height (H) not more than 5% of the diameter (D) of the opening (16) and at least 1% of the diameter (D) of the opening (16).

\* \* \* \* \*